United States Patent
Panigrahi et al.

(10) Patent No.: US 10,649,836 B2
(45) Date of Patent: May 12, 2020

(54) DETECTING AN ERROR MESSAGE AND AUTOMATICALLY PRESENTING LINKS TO RELEVANT SOLUTION PAGES

(71) Applicant: Dell Products L. P., Round Rock, TX (US)

(72) Inventors: Susobhit Panigrahi, Midnapur (IN); Shourya Pratap Singh, Bhopal (IN); Sarthak Mahapatra, Khorda (IN); Arundhati Mahapatro, Alipore (IN); Joydeep Mishra, Bhubaneswar (IN)

(73) Assignee: Dell Products L.L.P., Round Rock, TX (US)

( * ) Notice: Subject to any disclaimer, the term of this patent is extended or adjusted under 35 U.S.C. 154(b) by 193 days.

(21) Appl. No.: 15/978,800

(22) Filed: May 14, 2018

(65) Prior Publication Data
US 2019/0347149 A1 Nov. 14, 2019

(51) Int. Cl.
*G06F 11/00* (2006.01)
*G06F 11/07* (2006.01)
*G06F 16/248* (2019.01)
*G06F 16/2457* (2019.01)

(52) U.S. Cl.
CPC ........ *G06F 11/079* (2013.01); *G06F 11/0751* (2013.01); *G06F 11/0793* (2013.01); *G06F 16/248* (2019.01); *G06F 16/24578* (2019.01)

(58) Field of Classification Search
CPC ............... G06F 11/0751; G06F 11/079; G06F 11/0793; G06F 16/24578; G06F 16/248
See application file for complete search history.

(56) References Cited

U.S. PATENT DOCUMENTS

| 8,166,348 | B1* | 4/2012 | Kulkarni | G06F 11/0793 714/38.1 |
| 2005/0081108 | A1* | 4/2005 | Shabalin | G06F 11/263 714/38.11 |
| 2008/0052695 | A1* | 2/2008 | Dickenson | G06F 8/436 717/151 |
| 2009/0003345 | A1* | 1/2009 | Chang | H04L 41/0686 370/392 |
| 2009/0328004 | A1* | 12/2009 | Balasubramanian | G06F 11/362 717/125 |
| 2014/0173350 | A1* | 6/2014 | Roy | G06F 11/006 714/37 |

(Continued)

*Primary Examiner* — Joshua P Lottich
(74) *Attorney, Agent, or Firm* — Campbell Stephenson LLP; Shiv S. Naimpally

(57) ABSTRACT

In some examples, a server may receive, from a computing device, an error message generated by an executable file that is being executed by the computing device. The server may create, based at least in part on the error message, a search query and perform a search of one or more resources, such as, for example, knowledgebase(s), coding-related forum(s), and the like. The server may receive search results associated with the search query and rank the search results based on one or more criteria to create ranked results. For example, a particular result of the ranked results may include (1) a link to a page that includes a potential solution to an error that caused the error message to be generated and (2) a rank identifying a relevancy of the potential solution to the error. The server may send the ranked results to the computing device.

20 Claims, 5 Drawing Sheets

(56) References Cited

U.S. PATENT DOCUMENTS

| | | | |
|---|---|---|---|
| 2014/0380105 A1* | 12/2014 | Michel | G06F 11/0769 |
| | | | 714/57 |
| 2015/0169582 A1* | 6/2015 | Jain | G06F 16/3332 |
| | | | 707/748 |
| 2016/0041866 A1* | 2/2016 | Oleynikov | G06F 16/9535 |
| | | | 714/15 |
| 2017/0017538 A1* | 1/2017 | Rudorfer | G06F 11/0736 |
| 2017/0161138 A1* | 6/2017 | Oleynikov | G06F 11/0793 |
| 2017/0199876 A1* | 7/2017 | Malatesha | G06F 16/24578 |

* cited by examiner

DETECTING AN ERROR MESSAGE AND AUTOMATICALLY PRESENTING LINKS TO RELEVANT SOLUTION PAGES

BACKGROUND OF THE INVENTION

Field of the Invention

This invention relates generally to computing devices and, more particularly to detecting (e.g., intercepting) an error message produced by a compiler or a runtime environment (e.g., operating system) and automatically (e.g., without human interaction) displaying links to relevant solution pages in a knowledgebase, a forum, or both. The knowledgebase and forum may be located internally, e.g., inside an enterprise network, externally (e.g., external to the enterprise, such as on the Internet), or any combination thereof.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A software designer, whether a new hire, an intern, or an experienced designer, may, during the development, maintenance, or enhancement of software code, encounter a compiler error message or runtime error message that the designer is unfamiliar with and may not know how to resolve. When such an unknown or unfamiliar error is encountered, the software designer may manually copy the error information and perform a manual search of internal coding resources (e.g., internal documentation, coding-related forums, knowledgebase, or the like). Internal coding resources may be located on enterprise server(s) and may be internal to a corporation that employs the software designer. If the internal coding resources do not yield a solution, the software designer may perform a manual search of external coding resources (e.g., located on the Internet), such as for example, Stack Overflow, GitHub, and the like. Both the internal search and the external search may yield a large number of search results, not all of which may be relevant to the error message, causing the software designer to manually select search result links and view the corresponding pages until the software designer can identify a suitable solution. Such a manual process, in which a software designer searches coding resources and sifts through the search results to identify a solution is time consuming and tedious and reduces the software designer's productivity.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, an error handler executing on a computing device may intercept an error message generated by a program, such as a compiler or an executable file, being executed by the computing device. The error handler may send the error message to a server.

The server may, for example, be a node JavaScript (JS) server, and may receive the error message from the computing device. The server may parse the error message to extract keywords and create, based at least in part on the keywords in the error message, a search query. The server may use the search query to perform a search of one or more resources, such as, for example, knowledgebase(s), coding-related forum(s), and the like. The resources may include resources internal to a corporation (e.g., accessible by an intranet), resources external to the corporation (e.g., accessible by the internet), or both. The server may receive search results associated with the search query and rank the search results based on one or more criteria to create ranked results. For example, the search results may be ranked based on how many users have indicated that a particular page in the results included a solution that solved an error (e.g., compiler error or runtime error) that caused the error message to be generated. Each result in the ranked results may include (1) a link to a page that includes a potential solution to the error message and (2) a rank identifying a relevancy of the potential solution to the error. The server may send the ranked results to the computing device.

The computing device may receive and display the ranked results in a window. In response to receiving a user selection of a link in the ranked results, the computing device may open a browser and navigate the browser to an address specified by the link. The address may include a solution page with information identifying a solution to the exception that caused the error message. The information on the solution page may be used to make changes to a source code file to address the error message. In some cases, an automated agent may automatically modify the source code file based on the information on the solution page to address the error message. In other cases, a software designer may manually modify the source code file based on the information on the solution page to address the error message.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
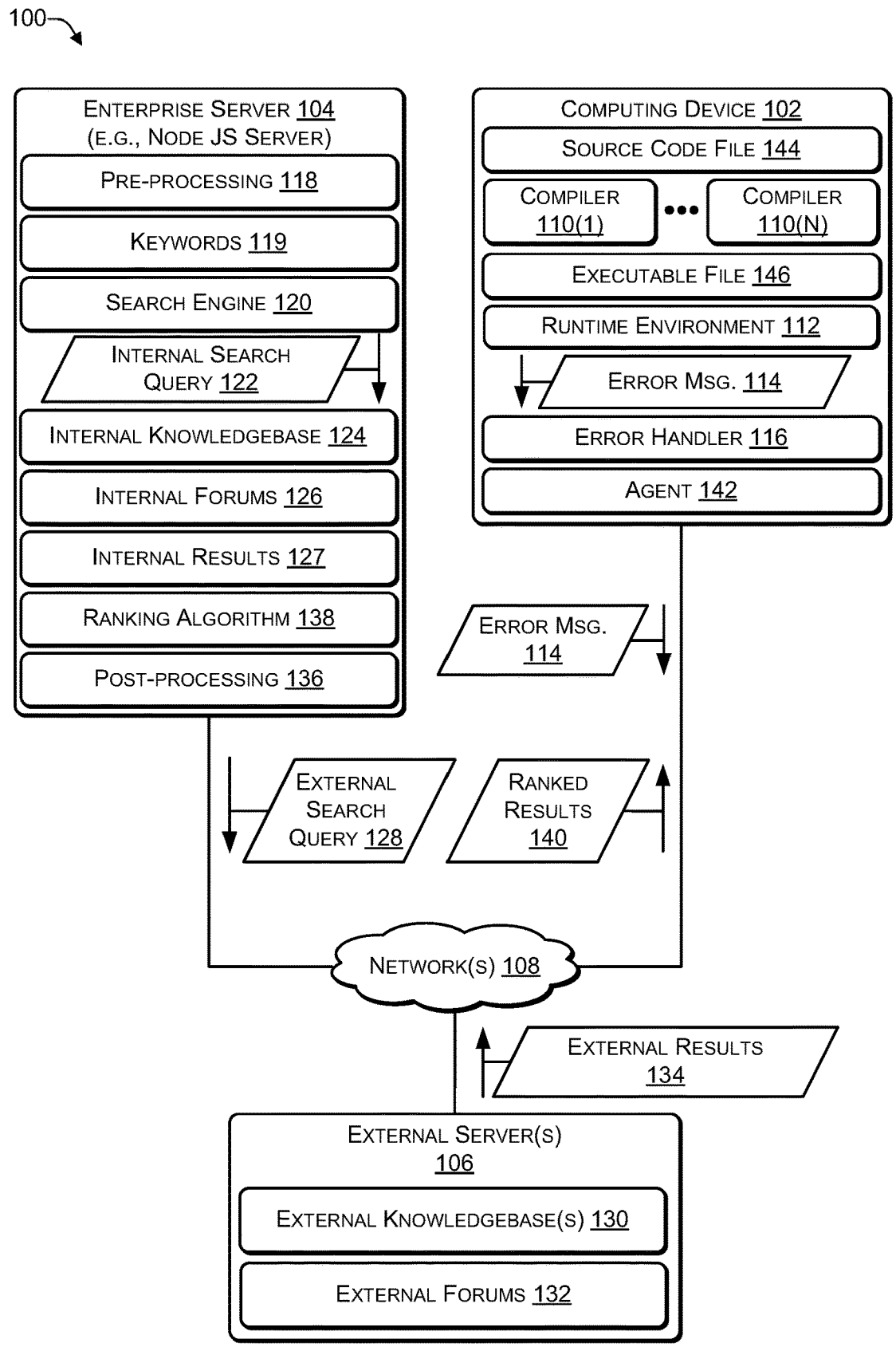
FIG. 1 is a block diagram of a system that includes a computing device and at least one server according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein automatically provide a software designer that is developing or modifying code (e.g., software instructions) with relevant solution(s) when the software designer encounters an error message caused by an exception during code development. Typically, the error message may arise either (1) after invoking a compiler to convert a source code file into an executable file (e.g., during compile time) or (2) after initiating execution of the executable file (e.g., during runtime).

An error handler executing on a computing device may intercept an error message (e.g., generated by either the compiler or the runtime environment) when an exception occurs during compile time or during runtime. In some cases, the error handler may be incorporated into an integrated development environment (IDE). Alternately, in the case of languages such as JavaScript, the software designer may include a JS file using a script tag in the source code file (e.g., prior to the start of code). For example, assume the name of the exception handler is "hamlet". Then, the software designer may include, the following at the top of the source code file (e.g., before the actual code):

<script src="hamlet.js"> </script>

Alternately, in languages that do not support direct handling of an exception, such as Java or C#.Net, the exception handler class may be included by the software designer in the source code file and the source code may use a "try catch block" exception handler with a generic exception object and pass it on to a Hamlet.handleException function, such as:

```
try{
    //code here
}catch(Exception e){
    String result=Hamlet.handleException(e);
    //display the solution text
}
```

After intercepting the exception, the error handler may send the error message associated with the exception to a server, such as, for example, a node js server. For example, for JavaScript, the following may be used:

window.error function: window.onerror=function(message, url, lineNumber) {//save error and send to server for example. return true;};

After receiving the error message, the server may perform a search of resources, such as a knowledgebase and/or a forum, to identify possible solutions. For example, the server may parse the error message, extract keywords, and use the keywords to create a search query.

In a large corporation (e.g., enterprise), the server may perform a search of internal resources. For example, the enterprise may have proprietary or customized tools (e.g., software language, compiler, development environment, and the like) that are used to develop software code. The enterprise may have internal servers (e.g., accessible via an intranet) that host a knowledgebase and/or a forum that has information about the error messages generated by the tools used in the corporation. In addition, software designers that develop software code for similar products may encounter similar errors. Thus, a search of internal resources in a large enterprise is likely to produce relevant results. If the internal search does not yield relevant results, then the server may perform a search of a knowledgebase and/or forum that is external to the corporation, such as resources accessible via the Internet. For example, if a new tools has been deployed in the corporation, the internal resources may not have information about error messages produced by the new tools. As another example, a tool may have been recently updated (e.g., to a newer version) and the updated tool may generate new (or modified) error messages that have not yet been discussed in the internal forums and internal knowledgebase. Thus, an external search may be performed if the internal search does not yield relevant results. In some cases, the server may simultaneously perform both an internal search (e.g., by sending a search query to an intranet search engine) and an external search (e.g., by sending a search query to an Internet search engine), rank the results of both searches, merge the N (N>0) highest ranked search results, and send the merged search results to the computing device.

In a smaller corporation, the software designers may use off-the-shelf tools and/or the corporation may lack the resources to maintain an internal knowledgebase and forum. Thus, for example, in the case of small corporations, the server may not perform a search of internal resources. Instead, after receiving the error message, the server may perform a search of external resources, such as, for example, stackoverflow.com, github.com, Microsoft® knowledgebase, and the like.

The search results may include links to solution pages. A solution page may be an entry in a knowledgebase, a post in a software development-related forum, or a thread in a software development-related forum. After the server receives the search results (e.g., from performing a search of internal resources, performing a search of external resources, or both), the search results may be ranked based on relevancy. For example, a relevancy score that numerically expresses the relevance of each search result to the exception that caused the error message may be created. For example, many knowledgebases and forums allow users to provide feedback (e.g. thumbs-up or thumbs-down) for each entry in the knowledgebase and each post in the forum. In such cases, each entry in a knowledgebase and each post in a forum may display a feedback request message, such as, for example, "select 'yes/thumbs-up' if this solution solved your problem and select 'no/thumbs-down' if it did not solve your problem" to enable users to provide feedback on the effectiveness of the solution described in the knowledgebase entry or forum post. The number of positive (e.g., yes/thumbs-up) responses received by a particular knowledgebase entry or by a particular forum post may be used to determine a relevance score for each search result. Of course, other criteria (e.g., keyword matches between the error message and a search result) may be used in addition to the positive responses when ranking relevancy. In some cases, a machine learning algorithm may determine a relevancy score that numerically expresses the relevance of each search result to the exception that caused the error message.

On some forums, such as StackOverflow.com, a parameter in the forum's application programming interface (API) may be used to specify the way in which forum post answers (e.g., solution pages) are displayed. This parameter may be used to sort the search results based on relevance or the most number of votes.

After the search results are ranked based on relevancy, the ranked search results may be sent to the computing device to be displayed to the software designer. In some cases, the top M (M>0) highest ranked search results may be sent to the computing device. Alternately, search results having a rank higher than a threshold amount may be sent to the computing device. In this way, relevant search results may be sent to the computing device while less relevant search results may not be sent. For example, the server may send the ranked search results to the error handler (e.g., hamlet in the above example). The error handler may open a new window and display at least a portion of the ranked search results in the window.

The search results that are displayed may include multiple results that are sorted based on rank, with higher ranking results displayed before lower ranking results. The search results may include link (e.g., hyperlink) to the corresponding solution page. For example, the software designer may select a link in the search results, causing a browser to open to the address (e.g., universal resource locator (URL)) associated with the link. The software designer may read the solution information in the browser and return to the development environment to address the error. For example, the software designer may open the source code file in an editor application and modify the source code file based on the solution information. The software designer may re-compile the modified source code file to create an updated executable file. If no errors are encountered during the compile process, the software designer may initiate execution of the executable file and begin testing. If the same error occurs, either during compilation or during testing of the executable file, the software designer may be presented with the same or similar ranked results as before and the software designer may select a different link, read different solution information, and repeat the process of editing the source code, compiling the source code to create an executable file, and testing the executable file. If a different error occurs, the software designer may be presented with different ranked results and the software designer may select a link, read the solution information, and repeat the process of editing the source code, compiling the source code to create an executable file, and testing the executable file.

The error handler may be designed to work with multiple compilers and multiple runtime environments. For example, for different software languages, the error handler may intercept the error message and send the error message to the server to find search results that include potential solutions.

In some cases, an automated agent may be used to mine text of error messages/logs to analyze and identify the most error-prone code regions. For example, analysis of error messages that are frequently generated may reveal the most common programming errors. New hires, students/interns, etc. may be provided with this information and documentation may be updated with information to help software designers avoid making such errors. In some cases, a call to the error handler may be automatically added to a source code file if the call is not currently present. Additionally, instead of including the error handler as a library at the start of the source code file, the error handler may be integrated (e.g., as part of a plugin) into popular integrated development environments (IDEs), such as, for example, Eclipse, IntelliJ Idea, Visual Studio, and the like. The plugins may look for the language in which the code is written, and call the respective calls to the server to search for a solution internally or externally.

In some implementations, an automated agent may use the search results to automatically (e.g., without human interaction) modify the source code according to the solution provided in the search results, automatically compile the source code, and execute the resulting executable file. For example, the automated agent may modify the source code to implement the highest ranked solution, compile, and execute. If the error message recurs, the automated agent automatically may modify the source code to implement the next highest ranked solution, compile, and execute, and so on until the original error message no longer occurs.

As a first example, a server may include one or more processors and one or more non-transitory computer-readable storage storing instructions that are executable by the one or more processors to perform various operations. For example, the operations may include receiving from a computing device, an error message generated by either (1) a compiler that is compiling a source code file into an executable file or (2) a runtime environment that is executing the executable file. The compiler or the runtime environment may be executing on the computing device. The error message may be sent by an error handler executing on the computing device that intercepts the error message sent from the compiler or the runtime environment. The server may create, based at least in part on the error message, a search query and perform a search of one or more resources comprising at least one of a knowledgebase or a forum. For example, the search query the search query may be created by parsing the error message, extracting, based at least in part on the parsing, keywords from the error message, and creating the search query based at least in part on the keywords. The server may receive one or more search results resulting from the search query and may rank the one or more search results based on one or more criteria to create ranked results Ranking the search results based on the one or more criteria to create the ranked results may include determining a positive feedback number associated with a particular search result of the one or more search results, determining a negative feedback number associated with the particular search result, subtracting the negative feedback number from the positive feedback number to create a net feedback number, and determining a rank of the particular search result based at least in part on the net feedback number. A particular result of the ranked results may include a link to a page that includes a potential solution to an error that caused the error message to be generated and a rank identifying a relevancy of the potential solution to the error. For example, the rank of the particular search result may be indicated based on a placement of the particular search result among the ranked results. In some cases, the server may create, based at least in part on the error message, an additional search query and perform an additional search of one or more additional resources (e.g., an external knowledgebase and/or external forum). The server may receive additional search results associated with the additional search query, rank the additional search results based on the one or more criteria to create additional ranked results, and send the additional ranked results to the computing device. For example, the one or more resources may be hosted by an enterprise server that is accessible using a corporate intranet and the one or more additional resources may be hosted by a server that is external to the corporate intranet.

As a second example, a server may include one or more processors and one or more non-transitory computer readable media storing instructions executable by the one or more processors to perform various operations. The operations may include receiving, from a computing device, an error message generated by an executable file (e.g., a compiler that is compile a source code file or a runtime environment that is executing a software application) that is being executed by the computing device. The server may create, based at least in part on the error message, a search query and perform a search of one or more resources that include at least a knowledgebase or a forum. For example, the server may create the search query by parsing the error message, extracting, based at least in part on the parsing, keywords from the error message, and create the search query based at least in part on the keywords. The server may determine a relevancy score associated with individual resources of a plurality resources. For example, the relevancy score associated with an individual resource may include a numerical representation of a relevancy of the individual resource to the error message. The server may select, based at least in part on the relevancy scores, the one or more resources (e.g., from the plurality of resources) on which to perform the search. The server may receive search results associated with the search query and rank the search results based on one or more criteria to create ranked results. A particular result of the ranked results may include a link to a page that includes a potential solution to an error that caused the error message to be generated and a rank indicating a relevancy of the potential solution to the error. For example, the rank of the particular result may be indicated by a placement (e.g., location) of the particular result in the ranked results. To illustrate, a high rank may cause the particular result to be placed earlier in the search results while a lower rank may cause the particular result to be placed later in the search results. The server may send the ranked results to the computing device. In some cases, the server may create an additional search query based at least in part on the error message, and perform an additional search of one or more additional resources, such as external resources. The server may receive additional search results associated with the additional search query, rank the additional search results based on the one or more criteria to create additional ranked results, and send the additional ranked results to the computing device. For example, the one or more additional resources may be hosted by an enterprise server that is accessible using a corporate intranet and the one or more resources may be hosted by a server that is external to the corporate intranet.

As a third example, a computing device may include one or more processors and one or more non-transitory computer readable media storing instructions executable by the one or more processors to perform various operations. The operations may include receiving an instruction to execute an executable file, executing the executable file, determining that an error message was generated in response to executing the executable file, and sending the error message to a server. The executable file may be a compiler (e.g., used to compile a source code file to create the executable file) or a previously compiled executable file. The error message may be generated by one of: a compiler that is compiling a source code file or a runtime environment in which the executable file is executing. The operations may include receiving a response from the server that includes ranked results. The ranked results may include a particular page from at least one of: a knowledgebase that includes information about the error message or a forum that includes a discussion about the error message. The ranked results may include a particular page from at least one of: an internal resource hosted by an enterprise server that is accessible using a corporate intranet or an external resource hosted by a server that is external to the corporate intranet. A particular result of the ranked results may include a link to a page that includes information associated with the error message and a rank identifying a relevancy of the information to the error. For example, the ranked results may be ordered according to rank such that a higher ranked result is displayed before a lower ranked result. The operations may include displaying at least a portion of the ranked results, receiving a selection of a particular ranked result of the ranked results, and navigating a browser, based on a particular link associated with the particular ranked result, to a page that includes the information associated with the error message. The operations may include opening a source code file in an editing application and automatically performing a modification to contents of the source code file to create modified source code. The modification may be performed based on the information associated with the error. The operations may include receiving an instruction to compile the modified source code to create a modified executable file and executing the modified executable file. The operations may include determining that an additional error message was generated in response to executing the modified executable file, sending the additional error message to the server, receiving an additional response from the server that includes additional ranked results, and displaying at least a portion of the additional ranked results. The operations may include receiving a selection of an additional link included in the additional ranked results and navigating the browser to an additional solution page associated with the additional link. For example, the additional solution page may include solution information associated with the additional error message.

FIG. 1 is a block diagram of a system 100 that includes a computing device and at least one server according to some embodiments. The system 100 may include a computing device 102 that a software designer may use to develop and test software code. For example, the computing device 102 may include a software development environment with various tools for creating and testing software code, The computing device 102 may be coupled to enterprise server 104 and one or more external servers 106 via a network 108. The network 108 may include multiple networks and may use multiple technologies, include wireless technologies (e.g., Wi-Fi, Bluetooth, CDMA, GSM, and the like) and wired technologies (e.g., Ethernet, DOCSIS, DSL, and the like).

The computing device 102 may be used by a software designer to develop software. For example, the computing device 102 may include one or more compilers such as, for example, a compiler 110(1) to a compiler 110(N) (N>0). Each of the compilers 110 may be capable of taking a source code file 144 written in a particular programming language, such as, for example, Java, JavaScript, C, C+, C#, Python, and the like, and compiling the source code file 144 into an executable file 146 that can be executed by a runtime environment 112 (e.g., an operating system). During the software development process, a software designer may create the source code file 144 and, based on the programming language used in the source code file 144, use one of the compilers 110 to create the executable file 146 that the software designer can execute (e.g., run) in the runtime environment 112.

When a compiler (e.g., one of the compilers 110) or the runtime environment 112 encounters an error, an error message 114 may be generated. For example, if a particular compiler of the compilers 110 encounters an error during the compilation process, the particular compiler may issue the error message 114. As another example, after the source code file 144 has been compiled into the executable file 146, when the executable file 146 is being executed in the runtime environment 112, if an error (e.g., an exception) is encountered during execution, the runtime environment 112 may generate the error message 114.

The computing device 102 may include an error handler 116. The error handler 116 may intercept error messages, such as the error message 114, generated by one of the compilers 110 or the runtime environment 112. For example, assume the name of the error handler 116 is "hamlet". The software designer may include error handler 116 by including the following at the top of the source code file (e.g., before the actual code):

<script src="hamlet.js"> </script>

Alternately, in languages that do not support direct handling of an error/exception, such as Java or C#.Net, the exception handler class may be included by the software designer in the source code file and the source code may use a "try catch block" exception handler with a generic exception object and pass it on to a Hamlet.handleException function, such as:

```
try{
    //code here
}catch(Exception e){
    String result=Hamlet.handleException(e);
    //display the solution text
}
```

Of course, the above are merely examples and other techniques may be used to capture, intercept, receive a notification, or determine when the error message 114 is generated. Each programming language or development environment may have their own particular mechanism to enable an application, such as the error handler 116, to be notified when the error message 114 is generated.

The error handler 116 may send the error message 114 to the enterprise server 104. The enterprise server 104 may perform a search of internal resources, external resources, or both to identify web pages with potential solutions to resolving the error message 114. The results (e.g., potential solutions) of the search may be presented to the software designer using a user interface (e.g., in a web browser) that the computing device 102 displays, as further discussed in FIG. 2. Thus, the error handler 116 may intercept or receive a notification that the error message 114 occurred either (1) during compile time, from one of the compilers 110, or (2) during execution, from the runtime environment 112. The error handler 116 may send the error message 114 to the enterprise server 104.

The enterprise server 104 may, for example, be a node JS server (e.g., a cross-platform JavaScript run-time environment to execute JavaScript code server-side). The enterprise server 104 may enable the use of JavaScript for server-side scripting to produce dynamic web page content that is sent for display to the software designer's web browser on the computing device 102. After the enterprise server 104 receives the error message 114, a pre-processing module 118 may perform pre-processing on the contents of the error message 114. For example, the pre-processing module 118 may remove stop words such as "a", "the", "is", "at", and like. The pre-processing module 118 may extract keywords 119 from the error message 114. The keywords 119 extracted by the pre-processing module 118 may be used by a search engine 120 to create a search query 122. The search engine 120 may use the search query 122 to perform a search of internal resources, external resources, or both. In some cases, the search engine 120 may determine which particular knowledgebases and particular forums to search. For example, if the search engine 120 determines that the keywords 119 are related to a particular topic (e.g., memory management, input/output (I/O), networking, or the like), the search engine 120 may select particular knowledgebases from multiple knowledgebases and/or particular forums from multiple forums and perform a search only on the selected knowledgebases and/or forums. Searching selected resources may be done to speed up the time taken to perform the search because searching and ranking results from searching a few selected resources may be faster than searching and ranking results from all known resources.

A large corporation that employs many software designers may have internal resources to help the software designers share knowledge about error messages. For example, the corporation may have one or more servers that host (1) knowledgebases storing information about the corporation's software development tools (e.g., compiler, runtime environment, and the like), (2) internal forums where software designers discuss error messages and share solutions to resolve the error message, or host both knowledgebases and forums. The search engine 120 may use the internal search query 122 to search such internal resources. For example, the search engine 120 may search a representative internal knowledgebase 124, and representative internal forums 126, and other internal resources that provide error message information to software designers.

The internal search query 122 may return internal search results 127. A ranking algorithm 138 may rank the internal search results 127. For example, the ranking algorithm 138 may determine a relevancy score associated with each of the internal search results 127 that numerically expresses a relevancy of the solution in a web page found in the internal results 127. The ranking algorithm 138 may rank the internal search results 127 to create ranked results 140 in which the results are ordered according to relevancy. For example, a high ranked result may be displayed before a lower ranked result in the ranked results 140. After the server receives the search results (e.g., from performing a search of internal resources, performing a search of external resources, or both), the search results may be ranked based on relevancy. A relevancy score may be determined for each result in the internal results 127. For example, the relevancy score that numerically expresses the relevance of a particular search result in the internal results 127 to the error message 114 may be based on feedback provided by readers of the solution described in the page referenced in the particular search result. For example, the internal knowledgebase 124 and the internal forums 126 may enable readers (e.g., software designers) to provide feedback (e.g. thumbs-up or thumbs-down) for individual entries in the internal knowledgebase 124 and in the internal forums 124. In such cases, each entry in the knowledgebase 124 and each post in a forum 124 may display a feedback request message, such as, for example, "select 'yes/thumbs-up' if this solution solved your problem and select 'no/thumbs-down' if it did not solve your problem" to enable users (e.g., software designers) to provide feedback on the effectiveness of the solution described in an individual knowledgebase page or forum post. The number of positive (e.g., yes/thumbs-up) responses received by a particular knowledgebase entry or by a particular forum post may be used to determine a relevance score for each search result. Of course, other criteria (e.g., keyword matches between the error message 114 and a particular search result) may be used in addition to the positive responses when ranking relevancy. In some cases, a machine learning algorithm may determine a relevancy score that numerically expresses the relevance of each search result to the exception that caused the error message. For example, the ranking algorithm 138 may use machine learning to identify those pages from the internal knowledgebase 124 and the internal forums 126 that have the most relevant solutions to the error being described in the error message 114.

In some cases, a post-processing module 126 may perform additional processing of the internal results 127 to create the ranked results 140. For example, the post-processing module 136 may select the M (M>0) highest ranked solutions after the internal results 127 have been ranked. To illustrate, the software designer may have a user profile specifying M, e.g., how many of the ranked results 140 are to be displayed. After the ranking algorithm 138 and the post-processing module 136 have processed the internal results 127 to create the ranked results 140, the ranked results 140 may be sent to the computing device 102.

Figure 2:
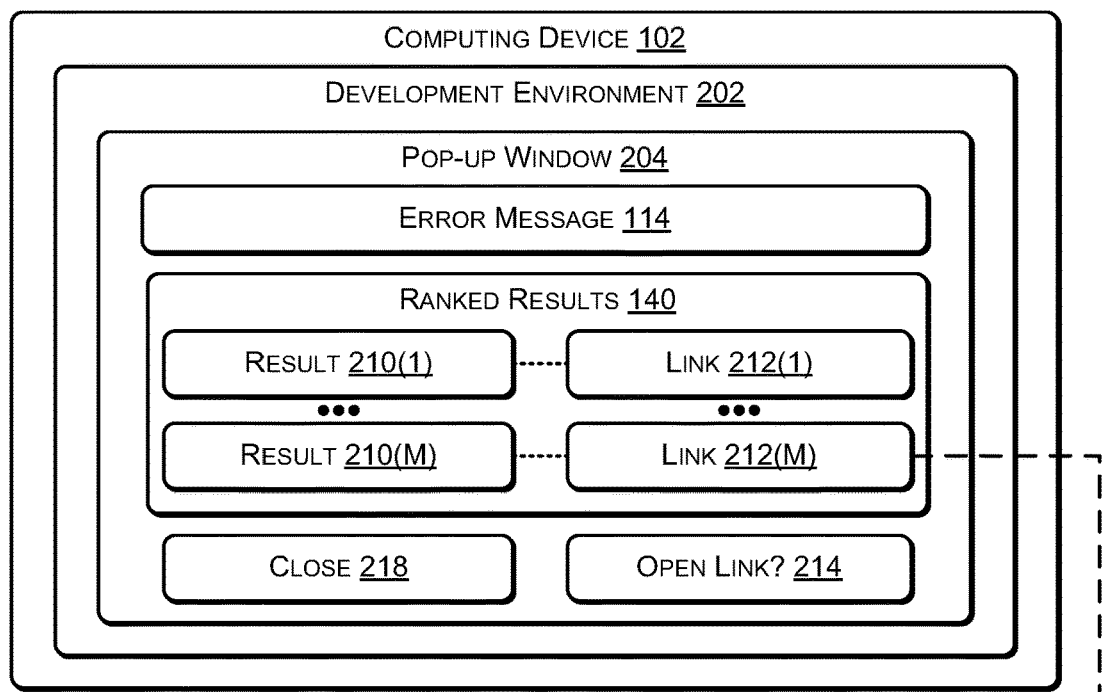
FIG. 2 is a block diagram illustrating a user interface (UI) that includes one or more ranked results according to some embodiments.
Figure 2:
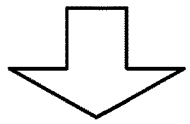
Figure 2:
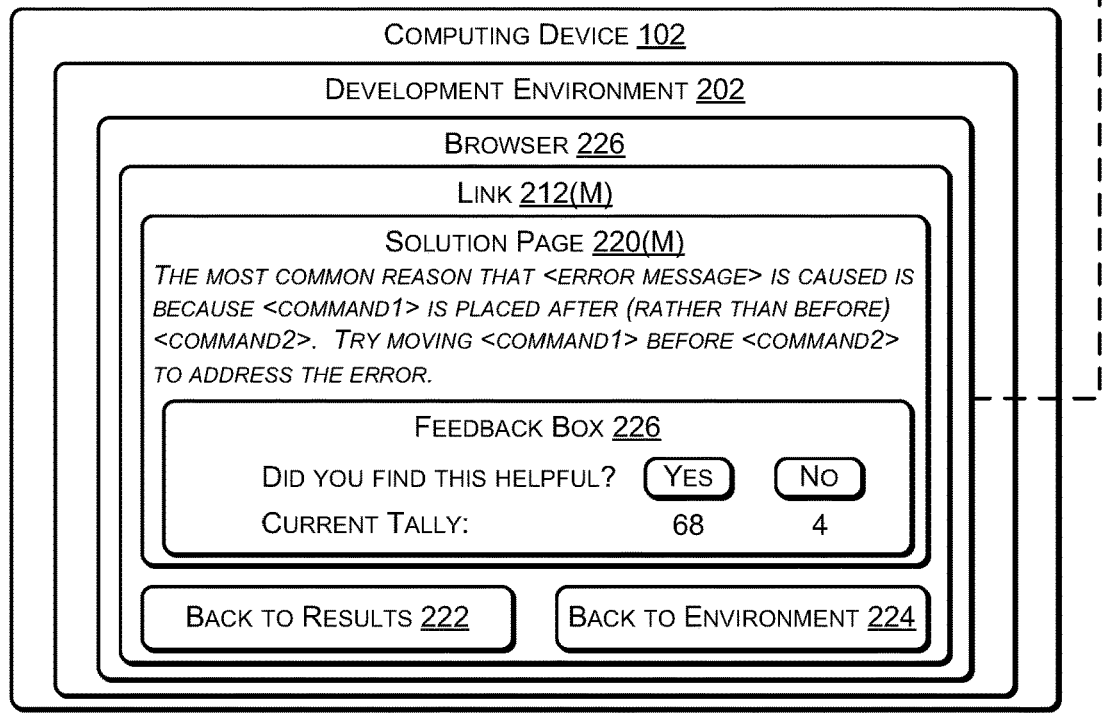

The error handler 116 may receive the ranked results 140 and display at least a portion of the ranked results 140 via a user interface on the computing device 102, as described in FIG. 2. The software designer may view the ranked results 140 and select one of the links to navigate a browser to the solution page corresponding to the selected link to view the potential solution and determine if the solution addresses the error described in the error message 114. The software designer may view the solution page, make modifications to the source code file 144 based on the solution described in the solution page, recompile the source code file 144 to create the executable file 146, and execute the executable file 146 in the runtime environment 112 to determine if the solution, as implemented in the source code changes, no longer causes the error message 114.

If the same error message 114 occurs, the ranked results 140 may be re-displayed and the software designer may select and view a different solutions page. For example, the software designer may initially view and implement a first potential solution in the highest ranked result of the ranked results 140. If the first potential solution does not resolve the error causing the error message, the software designer may view and implement a second potential solution in the next highest ranked result of the ranked results 140, and so on until the software designer identifies a solution that resolves the error causing the error message 114. If a different error message occurs, the different error message may be sent to the server 104 and another search may be performed and so on. In this way, the software designer may automatically receive information about potential solutions in the form of the ranked results 140 while developing the code, without stopping to manually search for potential solutions.

In some cases, for example, if the highest ranked result of the internal results 127 is below a predetermined amount, then the search engine 120 may determine that the results 127 of searching the internal knowledgebase 124 and the internal forms 126 did not identify relevant results. For example, a smaller corporation or a corporation with relatively few software designers may not provide (or may have a relatively small) internal knowledgebase 124, internal forums 126, or both. In such cases, the search engine 120 may create and send an external search query 128 to search external resources (e.g., knowledgebases and forums external to the corporation). In such cases, the search engine 120 may send an external search query 128 to external websites that are external to the corporation. The external search query 128 may be sent over the network 108 to the one or more external servers 106 to search external knowledgebases 130, external forums 132, or both. In response to the external search query 128, a search of the external knowledgebases 130 and/or the external forums 132 may provide external results 134 to the enterprise server 104. The ranking module 138 and the post-processing module 136 may process the external results 134 to rank and select a subset of the results 134. The ranking and selection process may be similar to that described above to create the ranked results 140 from the internal results 127. After the ranking algorithm 138 and the post-processing module 136 have processed the results 134 to create the ranked results 140, the ranked results 140 may be sent to the error handler 116 to be displayed to the software designer to enable the software designer to find a solution to the error message 114.

In some cases, the enterprise server 104 may simultaneously send both: (1) the internal search query 122 (e.g., of the internal resources 124, 126) and (2) the external search query 128. In such cases, the ranking algorithm 138 and the post-processing module 136 may process (e.g., by ranking and selecting a subset of) both the internal results 127 and the external results 134 to create the ranked results 140. In this way, if the highest ranked result from the both the internal results 127 and the external results 134 describe the same (or a similar) solution, then the software designer's confidence may increase that the solution described is likely to resolve the error that caused the error message 114.

In some implementations, an automated software agent 142 may automatically scan the ranked results 140, select a solution, and automatically modify the source code file 144 based on the solution identified in the ranked results 140. If two (or more) different search results have the same or similar ranking (e.g., the first rank of a first solution page and a second rank of a second solution page differ by less than a predetermined amount), then the automated software agent 142 may offer the software designer a choice of implementing one of the multiple solutions. For example, some errors can be resolved in more than one way. The automated software agent 142 may automatically identify the highest ranked solutions from the ranked results 140 and offer the software designer a choice. After the software designer selects one of the multiple solutions, the automated software agent 142 may automatically modify the source code file 144 accordingly.

While the system 100 illustrates the software development tools (e.g., compilers 110 and runtime environment 112) as being located on the computing device 102 and illustrates the searching and ranking modules (e.g., search engine 120 and ranking algorithm 138) as being located on the enterprise server 104, any number of the components illustrated on the computing device 102 may be located on the enterprise server 104 and any number of the components illustrated on the enterprise server 104 may be located on the computing device 102. For example, the pre-processing module 118 may be located on and executed by the computing device 102 to extract the keywords 119. In this example, the computing device 102 may send the keywords 119 to the enterprise server 104 instead of (or in addition to) the error message 114.

In some cases, both the software development tools illustrated on computing device 102 and the searching and ranking modules illustrated on the enterprise server 104 may be located on a single device. For example, a cloud-based software development environment may include both the contents that are illustrated as being on the computing device 102 and the contents that are illustrated as being on the enterprise server 104. As another example, a workstation-based software development environment may include both the contents that are illustrated as being on the computing device 102 and at least a portion of the contents that are illustrated as being on the enterprise server 104. In such an example, the computing device 102 may extract the keywords 119 and initiate an internal search, an external search, or both. The results 127, 134 may be sent to a cloud-based ranking engine that ranks the results and sends the ranked results 140 to the computing device 102.

Thus, an error handler executing on a computing device may intercept error messages. The error messages may be produced by a compiler compiling a source code file to create an executable file or by a runtime environment that is executing an executable file. The error handler may send the error message to an enterprise server. The enterprise server may perform a search of resources internal to the corporation, if available, and return ranked results. The ranked results may identify pages in a knowledgebase, software development-related forums, or both. Each of the pages in the ranked results may identify potential solutions to the error described by the error message received by the error handler. If the internal search does not yield results that are determined (e.g., ranked as) relevant to the error message, the enterprise server may perform a search of external servers such as external knowledgebases and external forums to identify web pages with potential solutions. In some cases, the enterprise server may simultaneously perform an internal search and an external search, combine the results of both searches, and rank the results. The ranked results may be displayed to the software designer to enable the software designer to view the potential solution pages, as described further in FIG. 2.

FIG. 2 is a block diagram 200 illustrating a user interface (UI) that includes one or more ranked results according to some embodiments. FIG. 2 illustrates how, after the error handler 116 of FIG. 1 receives the ranked results 140, the error handler 116 may open a window 204 (e.g., pop-up window) in a development environment 202. The window 204 may include the ranked results 140. In some cases, the pop-up window 204 may include at least a portion of the error message 114.

The pop-up window 204 may include at least a portion of the ranked results 140 that resulted from searching internal resources, external resources, or both. For example, the ranked results 140 may include a result 210(1) to a result 210(M) (M>0). Each of the results 210 may include a portion of the text from a corresponding web page describing a potential solution to the error message 114. Each of the results 210 may have a corresponding hyperlink. For example, a link 212(1) may be associated with the result 210(1) and a link 212(M) may be associated with the result 210(M).

The window 204 may include a selection 218 to close the window 204. The window 204 may enable the user to select one of the links 212 and make a selection 214 to open a selected one of the links 212. For example, selecting the link 212(M) may open up a browser 226 and navigate the browser 226 to the selected link 212(M) to display a corresponding solution page 220(M). The solution page 220(M) may be a web page in one of (1) the internal knowledgebase 124, (2) the internal forums 126, (3) the external knowledgebases 130, (4) the external forums 132. The software designer may view the solution page 220(M) in which information relevant to a solution to resolve the error message may be presented. After the software designer has viewed the solution page 220(M), the software designer may make a selection of 222 to return to the ranked results 140 or make a selection of 224 to return to the development environment 202.

The solution page 220(M) may be (1) an entry in a knowledgebase, such as one of the knowledgebases 124, 130 of FIG. 1 or (2) an individual post or a thread in a forum, such as the forums 126, 132 of FIG. 1. Each of the solution pages associated with the results 210 and having one of the links 212 may include a feedback box 226. The feedback box 226 may enable viewers of the solution page 220(M) to provide feedback regarding whether the solution described in the solution page 220(M) addressed the error message 114. For example, the software designer that is using the development environment 202 may implement the solution described in the solution page 220(M). If the error message 114 does not occur after the solution is implemented, the software designer may provide feedback via the feedback box 226 to indicate that "yes" the solution page 220(M) was helpful in addressing the error message 114. If the error message 114 recurs after the solution is implemented, the software designer may provide feedback via the feedback box 226 to indicate that "no" the solution page 220(M) was not helpful in addressing the error message 114. The feedback box 226 may keep a running total (e.g., current tally) of the number of "yes" responses and the number of "no" responses. The ranking algorithm 138 of FIG. 1 may use the running totals to determine the relevancy score for each of the results 210. In some cases, the current tally for the number of "yes" responses (e.g., 68 in FIG. 2) may be used to determine the relevancy score of the result 210(M) corresponding to the solution page 220(M). In other cases, the current tally for the number of "no" responses (e.g., 4 in FIG. 2) may be subtracted from the current tally for the number of "yes" responses (e.g., 68 in FIG. 2) to determine a net positive number (e.g., 68−4=64 in FIG. 2) that is then used to determine the relevancy score of the result 210(M)

corresponding to the solution page 220(M). In some cases, the relevancy of the forum or the knowledgebase in which the result 201(M) is located, along with the net positive number, may be used in determining the relevancy. Of course, other ranking criteria may be used. For example, software designers at a particular corporation may rank the relevancy of (e.g., the success in find finding a relevant solution in) internal and external resources, such as knowledgebases and forums, and this ranking may be part of the criteria used to rank the results.

Thus, when a software designer is developing software code, the software code may cause an error, such as a compiler error during compile time or a runtime exception during runtime. The compiler or the runtime environment may detect the error and generate an error message. Generating the error message may cause an error handler to be notified. The error handler may send the error message to a server. The server may perform an internal search, an external search or both of web pages, such as knowledgebases and software development-related forums, that may include information about potential solutions to the error. The results of the searches may be ranked, e.g., based on how many viewers indicated that they found the web page (e.g., describing a potential solution) useful in solving the error. The ranked results may be displayed in the development environment in which the software designer is developing the software code. For example, during software development, the software designer may instruct the compiler to convert a source code file into an executable file or instruct a runtime environment to execute the executable file. If an error/exception occurs, an error message may be displayed and, after a short period of time (e.g., typically a few hundred milliseconds and no more than ten seconds), the ranked search results offering potential solutions may be automatically displayed in the development environment. The software designer may select a link in the ranked results, causing a web browser to navigate to the web page corresponding to the link. After the web page is displayed, the software designer may view the information pertaining to a potential solution to the error that caused the error message. The software designer may modify the source code file based on the potential solution described in the web page. The software designer may repeat the process by instructing the compiler to compile the modified source code file to create a modified executable file and instructing the runtime environment to execute the modified executable file. In this way, when an error message is generated by the compiler or the runtime environment, web pages that include potential solutions to the error that caused the error message may be displayed shortly (e.g., within a few seconds) after the error message is displayed, enabling the user to quickly identify and resolve the error. The software designer no longer has to manually search knowledgebases and/or forums to identify potential solutions. Thus, software designers, particular those software designers that are relatively new to the software development environment, may become more productive because they can produce working software code in a much shorter time.

Figure 3:
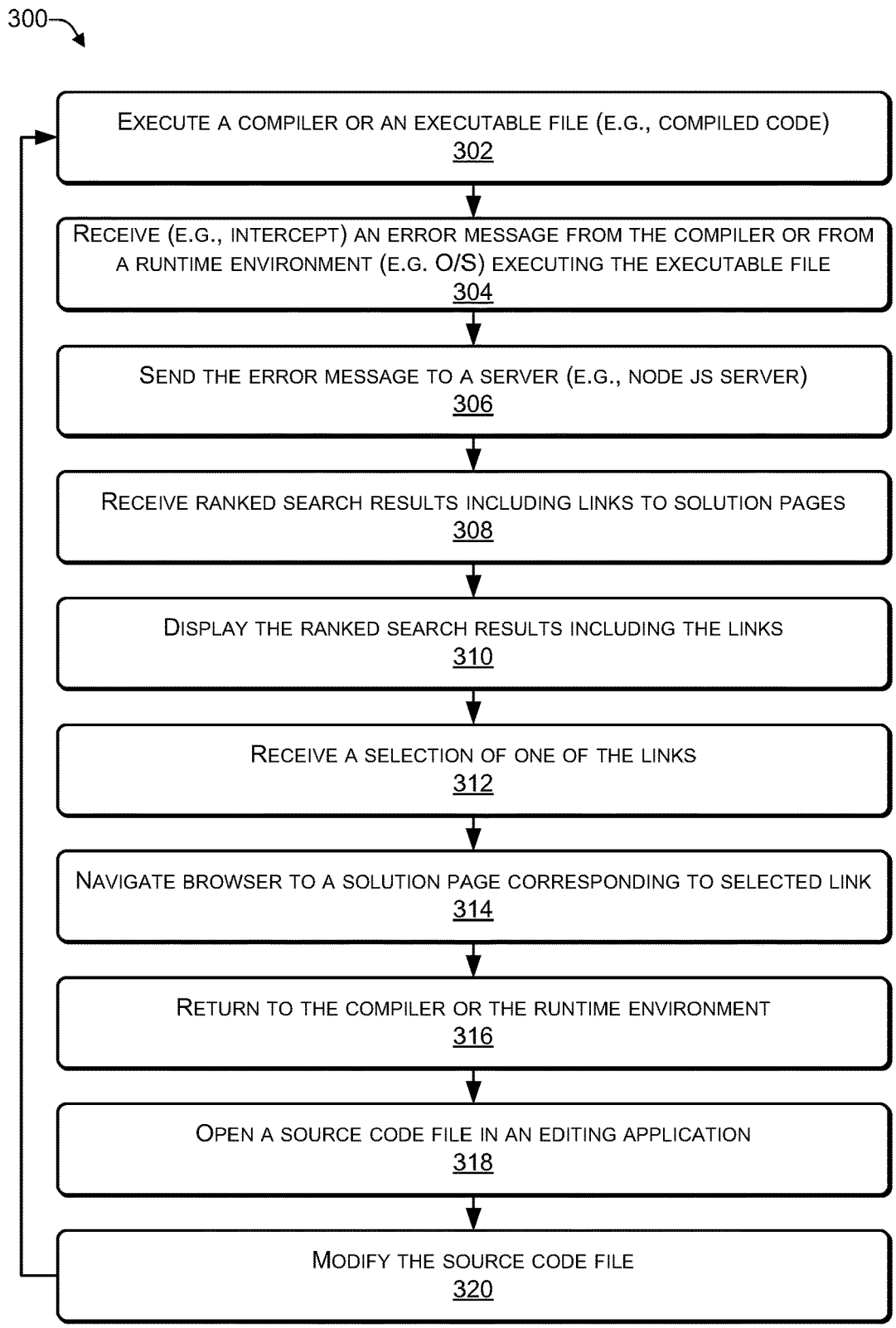
FIG. 3 is a flowchart of a process that includes intercepting an error message from a compiler or a runtime environment according to some embodiments.

FIG. 3 is a flow chart of a process 300 that includes receiving or intercepting an error message from a compiler or a runtime environment according to some embodiments. For example, the process 300 may be performed by one or more components of the computing device 102 of FIG. 1.

At 302, a compiler or an executable file may be executed. At 304, an error message from the compiler or from a runtime environment executing the executable file may be received. For example, in FIG. 1, a software designer may instruct one of the compilers 110 to compile the source code file 144 to create the executable file 146. The compiler 110 that is compiling the source code file 144 may generate the error message 114. Alternately, after the source code file 144 has been compiled to create the executable file 146, the software designer may initiate execution of the executable file 146 in the runtime environment 112. The runtime environment 112 may generate the error message 114 when executing the executable file 146 causes an error (e.g., exception). In either case, error handler 116 may receive or intercept the error message 114.

At 306, the error message may be sent to a server. For example, in FIG. 1, the error handler 116 may send the error message 114 to the enterprise server 104.

At 308, ranked search results that include links to solution pages may be received. At 310, the ranked search results including the links to solution pages may be displayed. For example, in FIG. 2, the ranked result 208 may be received and displayed. The ranked results 208 may include the results 210 that have been ordered according to relevancy or rank. The ranked results 208 may include links corresponding to addresses of solution pages of relevant results.

At 312, a selection of one of the links may be received. At 314, a browser may automatically navigate to a solution page corresponding to the selected link. For example, in FIG. 2, the software designer may select link 212(M) corresponding to result 210(M). In response to receiving the selection of the link 212(M), the computing device 102 may open a browser and open up the browser to an address corresponding to the link 212(M) to display the solution page 220(M).

At 316, the process may return to the compiler. At 318, a source code file may be opened in an editing application. At 320, the source code file may be modified, and the process may proceed to 302 where a compiler is used to compile the modified source code file to create a modified executable file. For example, in FIG. 2, after the software designer views the solution page 220(M), the software designer may edit the source code file 144 of FIG. 1 and use one of the compilers 110 to compile the updated source code file 144 to create an updated executable file 146.

Figure 4:
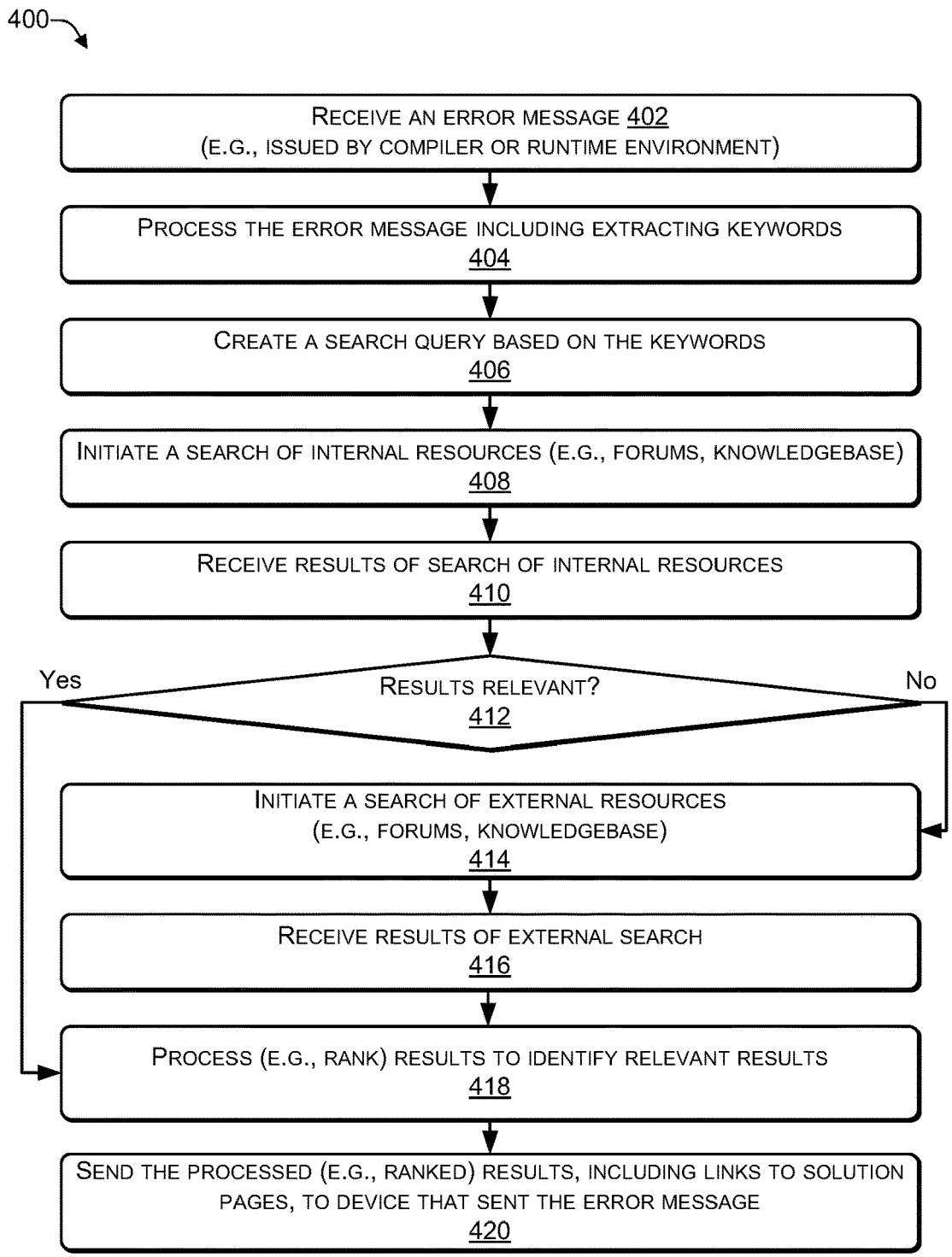
FIG. 4 is a flowchart of a process that includes processing (e g, ranking) search results according to some embodiments.

FIG. 4 is a flow chart of a process 400 that includes processing search results according to some embodiments. For example, the process 400 may be performed by one or more components of the enterprise server 104 of FIG. 1.

At 402, an error message may be received. At 404, the error message may be processed including extracting keywords from the error message. At 406 a search query may be created based on the keywords. For example, in FIG. 1, the enterprise server 104 may receive the error message 114. The pre-processing module 118 may extract the keywords 119 from the error message 114. The keywords 119 may be used by the search engine 120 to create the internal search query 122 which searches the internal knowledgebase 124 and the internal forums 126 to produce the internal results 127.

At 408, a search of internal resources may be initiated. For example, the search engine 120 may create the internal search query 122 based on the keywords 119 and search the internal knowledgebase 124 and/or the internal forums 126.

At 410, results of a search of the internal resources may be received. For example, the internal results 127 of performing the internal search query 122 across the internal knowledge base 124 and/or the internal forums 126 may be received.

At 412, a determination may be made whether the results are relevant. For example, the post-processing module 136 may analyze the internal results 127 and determine based on the ranks given by the ranking algorithm 138 to the internal results 127 whether an additional search of external resources is to be performed. If a determination is made at 412, that "no", the results are not relevant, then the process proceeds to 414 where a search of external resources may be initiated. At 416, results of the external search may be received. For example, in FIG. 1, the search engine 120 may use the keywords 119 to create the external search query 128 to search the external knowledge bases 130 and the external forums 132. In response to sending the external search query 128, the enterprise server 104 may receive the external results 134. The external results 134 may include results of searching the external knowledgebases 130 and the external forums 132.

At 418, the results of the search may be processed (e.g., ranked) to identify relevant results. At 420, the processed (e.g., ranked) results, including links to solution pages, may be sent to the device that sent the error message. For example, in FIG. 1, the ranking algorithm 138 and the post-processing module 136 may rank the external results 134. The highest-ranking portion of the external results 140 may be selected to produce the ranked results 140. The ranked results 140 may be sent to the computing device 102. The ranked results 140 may be displayed to the software designer to enable the software designer to select one or more of the links to view a solution page that describes a solution to resolve the error described in the error message 114.

At 412, if a determination is made that "yes", the results of the search of the internal resources are relevant (e.g., the results have high rankings), then the process may proceed to 418 where the results of the internal search may be processed (e.g., ranked) to identify relevant results. At 420, the processed (e.g., ranked) results, including links to solution pages, may be sent to the device that sent the error message. For example, if the internal results 127 indicate relevant results, then the enterprise server 104 may not perform the external search query 128. If the internal results 127 are relevant (e.g., high ranking), the ranking algorithm 138 may rank the results 127 and select a portion of the highest ranked results to create the ranked results 140. The server 104 may send the ranked results 140 to the computing device 102. The ranked results 140 may include links to solution pages in the internal knowledgebase 124 and/or the internal forums 126. The software designer may view the results in the ranked results 140 and select one or more of the links to view the solution pages. The software designer may modify the source code file 144 based on the solution pages.

Figure 5:
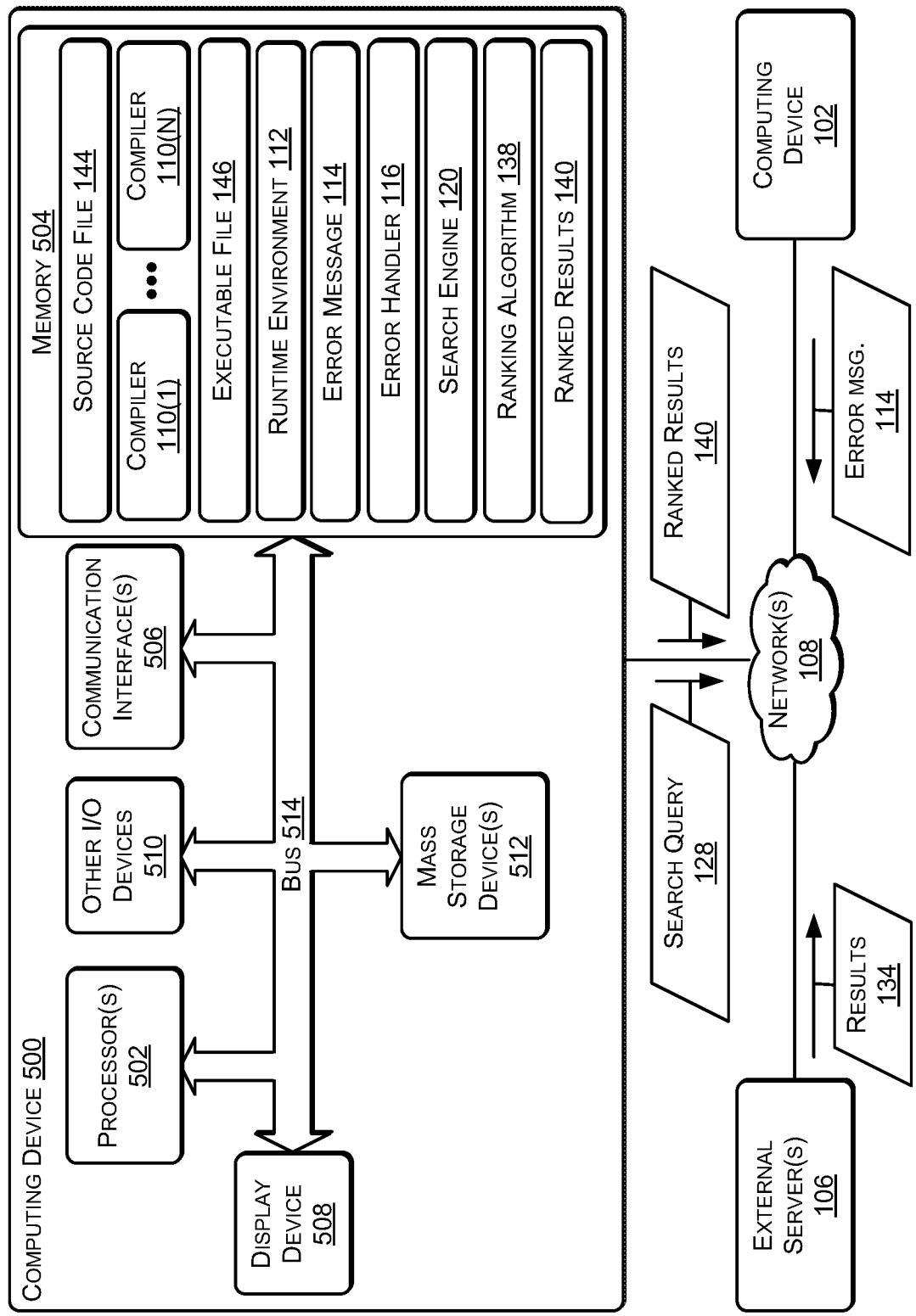
FIG. 5 illustrates an example configuration of a computing device that can be used to implement the systems and techniques described herein.

FIG. 5 illustrates an example configuration of a computing device 500 that can be used to implement the systems and techniques described herein, such as for example, the computing device 102 and the enterprise server 104 of FIG. 1. The computing device 100 may include one or more processors 502 (e.g., CPU, GPU, or the like), a memory 504, communication interfaces 506, a display device 508, other input/output (I/O) devices 510 (e.g., keyboard, trackball, and the like), the sensors 206, and one or more mass storage devices 512 (e.g., disk drive, solid state disk drive, or the like), configured to communicate with each other, such as via one or more system buses 514 or other suitable connections. While a single system bus 514 is illustrated for ease of understanding, it should be understood that the system buses 514 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 502 are one or more hardware devices that may include a single processing unit or a number of processing units, all of which may include single or multiple computing units or multiple cores. The processors 502 may include a graphics processing unit (GPU) that is integrated into the CPU or the GPU may be a separate processor device from the CPU. The processors 502 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 502 may be configured to fetch and execute computer-readable instructions stored in the memory 504, mass storage devices 512, or other computer-readable media.

Memory 504 and mass storage devices 512 are examples of computer storage media (e.g., memory storage devices) for storing instructions that can be executed by the processors 502 to perform the various functions described herein. For example, memory 504 may include both volatile memory and non-volatile memory (e.g., RAM, ROM, or the like) devices. Further, mass storage devices 512 may include hard disk drives, solid-state drives, removable media, including external and removable drives, memory cards, flash memory, floppy disks, optical disks (e.g., CD, DVD), a storage array, a network attached storage, a storage area network, or the like. Both memory 504 and mass storage devices 512 may be collectively referred to as memory or computer storage media herein and may be any type of non-transitory media capable of storing computer-readable, processor-executable program instructions as computer program code that can be executed by the processors 502 as a particular machine configured for carrying out the operations and functions described in the implementations herein.

The computing device 500 may include one or more communication interfaces 506 for exchanging data via the network 110. The communication interfaces 506 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 506 can also provide communication with external storage, such as a storage array, network attached storage, storage area network, cloud storage, or the like.

The display device 508 may be used for displaying content (e.g., information and images) to users. Other I/O devices 510 may be devices that receive various inputs from a user and provide various outputs to the user, and may include a keyboard, a touchpad, a mouse, a printer, audio input/output devices, and so forth.

The computer storage media, such as memory 116 and mass storage devices 512, may be used to store software and data. For example, the computer storage media may be used to store the source code file 144, the compilers 110, the executable file 146, the runtime environment 112, the error message 114, the error handlers 116, the searching engine 120, the ranking algorithm 138, the ranked results 140, an operating system, device drivers, and other software applications.

Thus, when a software designer is developing software code, the software code may cause an error, such as a compiler error during compile time or a runtime exception during runtime. The compiler 110 or the runtime environment 112 may detect the error and generate the error message 114. Generating the error message 114 may cause the error handler 116 to be notified. The error handler 116 may cause the search engine 120 to perform a search based on the error message 114. The search may include an internal search, an external search or both. The search engine may search resources, such as knowledgebases and software development-related forums, that may include information about potential solutions to the error associated with the error message 114. The results of the searches may be ranked, e.g., based on how many viewers indicated that they found the web page (e.g., describing a potential solution) useful in solving the error to create the ranked results 140. The ranked results 140 may be displayed in the development environment in which the software designer is developing the software code.

For example, during software development, the software designer may instruct one of the compilers 110 to convert the source code file 144 into the executable file 146 or instruct the runtime environment 112 to execute the executable file 146. If an error/exception occurs, the error message 114 may be displayed and, after a short period of time (e.g., typically a few hundred milliseconds and no more than ten seconds), the ranked search 140 results offering potential solutions may be automatically displayed in the development environment. The software designer may select a link in the ranked results 140, causing a web browser to navigate to the web page corresponding to the link. After the web page is displayed, the software designer may view the information pertaining to a potential solution to the error that caused the error message. The software designer may modify the source code file 144 based on the potential solution described in the web page. The software designer may repeat the compile-execute-debug process by instructing one of the compilers 110 to compile the modified source code file 144 to create the modified executable file 146. The software designer may instruct the runtime environment 112 to execute the modified executable file 146. In this way, when the error message 114 is generated by the compiler 110 or the runtime environment 112, web pages that include potential solutions to the error that caused the error message 114 may be displayed shortly (e.g., within a few seconds) after the error message 114 is displayed, enabling the software designer to quickly identify and resolve the error. The software designer no longer has to manually search knowledgebases and/or forums to identify potential solutions. Thus, software designers, particular those software designers that are relatively new to the software development environment, may become more productive because they can produce working software code in a much shorter time.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    receiving, by one or more processors and from a computing device, an error message generated by either a compiler or a runtime environment being executed by the computing device;
    creating, by the one or more processors and based at least in part on the error message, a search query;
    performing, by the one or more processors and using the search query, a search of one or more resources comprising at least one of a knowledgebase or a forum;
    receiving, by the one or more processors, one or more search results associated with the search query;
    ranking, by the one or more processors, the one or more search results based on one or more criteria to create ranked results, wherein a particular result of the ranked results comprises:
        a link to a page that includes a potential solution to an error that caused the error message to be generated; and
        a rank identifying a relevancy of the potential solution to the error;
    sending the ranked results to the computing device;
    creating, based at least in part on the error message, an additional search query; and
    performing, using the additional search query, an additional search of one or more additional resources.

2. The method of claim 1, wherein the error message is sent by an error handler being executed by the computing device that intercepts the error message sent from the compiler or the runtime environment.

3. The method of claim 1, wherein creating the search query comprises:
    parsing the error message;
    extracting, based at least in part on the parsing, keywords from the error message; and
    creating the search query based at least in part on the keywords.

4. The method of claim 1, wherein ranking the search results based on the one or more criteria to create the ranked results comprises:
   determining a positive feedback number associated with a particular search result of the one or more search results;
   determining a negative feedback number associated with the particular search result of the one or more search results;
   subtracting the negative feedback number from the positive feedback number to create a net feedback number; and
   determining a rank of the particular search result based at least in part on the net feedback number.

5. The method of claim 1, further comprising:
   determining a relevancy score associated with individual resources of a plurality of resources, wherein the relevancy score associated with an individual resource comprises a numerical representation of a relevancy of the individual resource to the error message; and
   selecting, based at least in part on the relevancy score associated with the individual resources, the one or more resources of the plurality of resources.

6. The method of claim 1, further comprising:
   receiving additional search results associated with the additional search query;
   ranking the additional search results based on the one or more criteria to create additional ranked results; and
   sending the additional ranked results to the computing device.

7. The method of claim 1, wherein:
   the one or more resources are hosted by an enterprise server that is accessible using a corporate intranet; and
   the one or more additional resources are hosted by a server that is external to the corporate intranet.

8. A server comprising:
   one or more processors; and
   one or more non-transitory computer readable media storing instructions executable by the one or more processors to perform operations comprising:
      receiving, from a computing device, an error message generated by an executable file that is being executed by the computing device;
      parsing the error message;
      extracting, based at least in part on the parsing, keywords from the error message;
      creating, based at least in part on the keywords from the error message, a search query;
      performing a search of one or more resources comprising at least one of a knowledgebase or a forum;
      receiving one or more search results associated with the search query;
      ranking the one or more search results based on one or more criteria to create ranked results, wherein a particular result of the ranked results comprises:
         a link to a page that includes a potential solution to an error that caused the error message to be generated; and
         a rank identifying a relevancy of the potential solution to the error; and
      sending the ranked results to the computing device.

9. The server of claim 8, wherein ranking the search results based on the one or more criteria to create the ranked results comprises:
   determining a positive feedback number associated with a particular search result of the one or more search results;
   determining a negative feedback number associated with the particular search result of the one or more search results;
   subtracting the negative feedback number from the positive feedback number to create a net feedback number; and
   determining a rank of the particular search result based at least in part on the net feedback number.

10. The server of claim 8, the operations further comprising:
    determining a relevancy score associated with individual resources of a plurality of resources, wherein the relevancy score associated with an individual resource comprises a numerical representation of a relevancy of the individual resource to the error message; and
    selecting, based at least in part on the relevancy score associated with the individual resources, the one or more resources of the plurality of resources.

11. The server of claim 8, the operations further comprising:
    creating, based at least in part on the error message, an additional search query; and
    performing an additional search of one or more additional resources.

12. The server of claim 11, the operations further comprising:
    receiving additional search results associated with the additional search query;
    ranking the additional search results based on the one or more criteria to create additional ranked results; and
    sending the additional ranked results to the computing device.

13. The server of claim 11, wherein:
    the one or more additional resources are hosted by an enterprise server that is accessible using a corporate intranet; and
    the one or more resources are hosted by a server that is external to the corporate intranet.

14. One or more non-transitory computer readable media storing instructions executable by one or more processors to perform operations comprising:
    receiving an instruction to execute, using the one or more processors, an executable file;
    executing the executable file;
    determining that an error message was generated in response to executing the executable file;
    sending the error message to a server;
    receiving a response from the server that includes ranked results, wherein a particular result of the ranked results comprises:
       a link to a page that includes information associated with the error message; and
       a rank identifying a relevancy of the information to the error message;
    displaying at least a portion of the ranked results;
    receiving a selection of a particular ranked result of the ranked results;
    navigating, based on a particular link associated with the particular ranked result, to a browser to the page that includes the information associated with the error;
    opening a source code file in an editing application; and
    automatically performing a modification to contents of the source code file to create modified source code, the modification based on the information associated with the error.

15. The one or more non-transitory computer readable media of claim 14, wherein:

the executable file comprises one of a compiler or a previously compiled executable file.

16. The one or more non-transitory computer readable media of claim 14, wherein:
the error message is generated by one of:
a compiler that is compiling a source code file; or
a runtime environment in which the executable file is executing.

17. The one or more non-transitory computer readable media of claim 14, further comprising:
creating, based at least in part on the error message, an additional search query; and
performing, using the additional search query, an additional search of one or more additional resources.

18. The one or more non-transitory computer readable media of claim 17, the operations further comprising:
receiving an instruction to compile the modified source code to create a modified executable file;
executing the modified executable file;
determining that an additional error message was generated in response to executing the modified executable file;
sending the additional error message to the server;
receiving an additional response from the server that includes additional ranked results;
displaying at least a portion of the additional ranked results;
receiving a selection of an additional link included in the additional ranked results; and
navigating the browser to an additional solution page associated with the additional link, the additional solution page including solution information associated with the additional error message.

19. The one or more non-transitory computer readable media of claim 14, wherein the ranked results include a particular page from at least one of:
a knowledgebase that includes information about the error message; or
a forum that includes a discussion about the error message.

20. The one or more non-transitory computer readable media of claim 14, wherein the ranked results include a particular page from at least one of:
an internal resource hosted by an enterprise server that is accessible using a corporate intranet; or
an external resource hosted by a server that is external to the corporate intranet.

* * * * *